United States Patent [19]

Filderman

[11] 4,312,182
[45] Jan. 26, 1982

[54] HYDRAULIC CONTROL FOR AUTOMOBILE BRAKES

[75] Inventor: René G. Filderman, Asnieres, France

[73] Assignee: Societe Anonyme Francaise du Ferodo, Paris, France

[21] Appl. No.: 52,234

[22] Filed: Jun. 26, 1979

Related U.S. Application Data

[63] Continuation of Ser. No. 786,867, Apr. 12, 1977, abandoned.

[30] Foreign Application Priority Data

Apr. 12, 1976 [FR] France .............................. 76 10641
Dec. 10, 1976 [FR] France .............................. 76 37199

[51] Int. Cl.$^3$ .............................................. F15B 7/00
[52] U.S. Cl. ........................................ 60/581; 60/554; 60/556; 91/460
[58] Field of Search ................ 60/546, 547 R, 548, 60/552, 553, 554, 561, 581, 582, 588, 555, 556, 557; 91/460

[56] References Cited

U.S. PATENT DOCUMENTS

| | | | |
|---|---|---|---|
| 2,852,920 | 9/1958 | Stelzer | 60/556 |
| 2,883,830 | 4/1959 | Stelzer | 60/557 |
| 3,545,206 | 12/1970 | Belart | 60/581 |
| 3,698,190 | 10/1972 | Miyai | 60/582 |
| 3,874,745 | 4/1975 | Peruglia | 60/547 R |

FOREIGN PATENT DOCUMENTS 1333050 10/1973 United Kingdom ................ 60/582

Primary Examiner—Abraham Hershkovitz
Attorney, Agent, or Firm—Young & Thompson

[57] ABSTRACT

The invention relates to a hydraulic control, particularly for automobile brake systems having two separate independent brake circuits, in which a master cylinder comprises a first chamber in which pressure is controlled by the driving-in of a master piston under the action of a brake pedal, the first chamber forms a part of a first hydraulic closed system comprising a first brake circuit, the master cylinder also has a second pressure chamber forming part of a second closed system comprising a second brake circuit. The second chamber is adapted to be fed by a source of fluid pressure and the master cylinder is provided with a plunger the opposite faces of which are respectively subjected to the pressures of the two closed systems. The master piston is disposed in the first chamber coaxially with the plunger in such a manner as to permit mechanical intervention in the event of hydraulic failure in the first closed system. The feature of the invention resides in the mounting of the piston in a part accommodated in the body of the master cylinder.

17 Claims, 8 Drawing Figures

HYDRAULIC CONTROL FOR AUTOMOBILE BRAKES

This is a continuation of application Ser. No. 786,867, filed Apr. 12, 1977, now abandoned.

BACKGROUND OF THE INVENTION

This invention relates to a hydraulic control, particularly for an automobile brake system comprising two separate independent circuits for safety reasons, in which each circuit may comprise brake cylinders distributed over the various wheels, the hydraulic control being of the kind in which a master cylinder comprises a first chamber in which pressure is controlled by the driving-in of a master piston under the action of a brake pedal, said first chamber forming part of a first hydraulic closed system comprising a first brake circuit, the master cylinder also having a second pressure chamber forming a part of a second brake circuit, the said second chamber being adapted to be fed by a source of fluid pressure, the said master cylinder being provided with a plunger whose two opposite faces are subjected respectively to the pressures of the two closed systems and forming a valve which cooperates with a seat to define an annular passage of variable section interposed between the second enclosed system on the one hand and a pipe discharging to a reservoir on the other hand, in such a manner that under the action of the pressure applied by the master piston in the first enclosed system for braking purposes the plunger assumes a position of equilibrium in which the passage section is modulated and with the aid of which the pressures in the two enclosed systems are kept proportional (for example equal).

The present invention has as an object a hydraulic control for a braking device, particularly in an automobile vehicle, of the kind indicated above, with the aid of which excellent operating performance is obtained both under normal conditions and in the event of the failure of one of the circuits.

According to the invention a hydraulic control, particularly for a braking device of an automobile vehicle, is characterised in that the plunger is mounted in a part accommodated in the body of the master cylinder. The plunger preferably has a head having a conical annular peripheral bearing surface applied against the seat, and a frontal centre part surrounded by the said conical bearing surface and having a preferably conical ogival shape, of which the half-angle at the apex is slightly greater than the half-angle at the apex of the conical bearing surface.

Due to this device excellent conditions are found for the movement of the leakage flow from the second vessel to the reservoir, with appropriate modulation.

In a preferred embodiment the conical bearing surface has a half-angle at the apex of between 40° and 50°, advantageously close to 45°, while the ogive has a half-angle at the top which is between 50° and 60°, advantageously close to 55°.

The head of the plunger preferably extends into a cavity provided in a part engaged in the body of the master cylinder and having passages for communication between the said cavity and the reservoir, which passages are always open whatever the position in which this part is installed.

According to another aspect of the present invention the master piston of the master cylinder which controls the pressure in the first closed system is disposed in the first chamber coaxially with the plunger in such a manner as to permit mechanical intervention in the event of hydraulic failure in the first closed system, the master piston being returned by a first spring and receiving a rod which is adapted to come into contact with the plunger, this rod being coupled to the master piston by a second spring which has no initial stressing and which serves as a simulator of resistance to the depression of the brake pedal.

According to yet another aspect of the invention the end of the plunger which is subjected to the pressure of the first closed system has a section different from that of the seat associated with the second closed system. This makes it possible to obtain an amplification effect or, where necessary, to achieve perfect equalisation of the pressures in the two closed systems.

The master piston is preferably in the form of a hollow sleeve in which is engaged a collar of the rod forming a movable seat for the second spring.

As an alternative the master cylinder may have a bore provided with a shoulder against which the said attached part is applied, while an annular recess is defined, on the first chamber side, between the bore of the master cylinder and the plunger and a seal is inserted into this annular recess with its outer face applied against the bore of the master cylinder and its inner face applied against the plunger. For preference the seal has a generally U-shaped section, with two lips forming respectively the faces applied against the bore of the cylinder and against the plunger and extending towards the first chamber.

An arrangement of this kind has the advantage of not only ensuring economy in construction, because a single seal performs the functions of two, but also of improving conditions of tightness. The pressure of the first chamber acts in fact directly and symmetrically on the two lips of the seal, thus ensuring excellent sealing by the two lips.

According to another characteristic, means are provided for holding the seal in the axial position and consist of a return spring for the master piston.

The master piston preferably cooperates on the one hand permanently with the said return spring and on the other hand, in the event of the failure of the first vessel, after the master piston has been retracted, with a second spring acting between the master piston and the plunger in order to provide modulating resistance simulating a back-pressure.

The source of fluid pressure may be of the permanent flow volumetric type or else of any other type, particularly of the constant pressure type.

DESCRIPTION OF THE PREFERRED EMBODIMENTS

Figure 1:
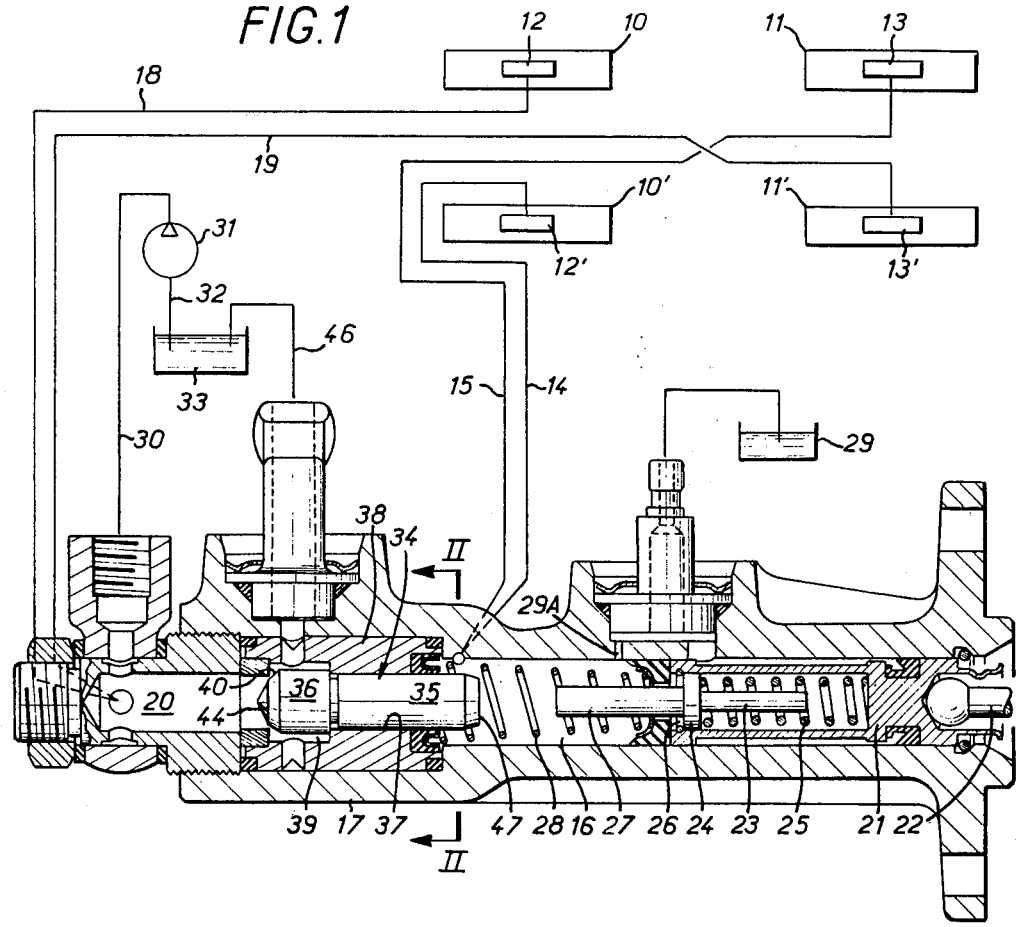
FIG. 1 is a sectional elevation of a control master cylinder according to the invention and shows diagrammatically the hydraulic circuits.
Figure 2:
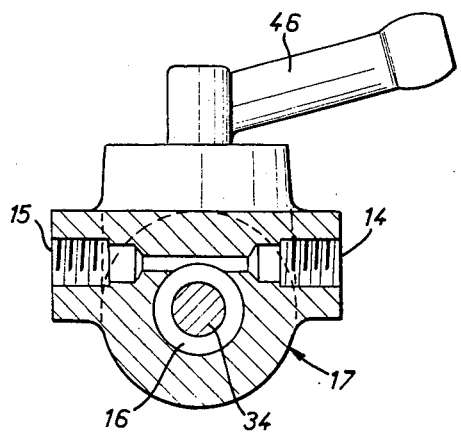
FIG. 2 is a view of the master cylinder in section on the line II—II in FIG. 1.
Figure 3:
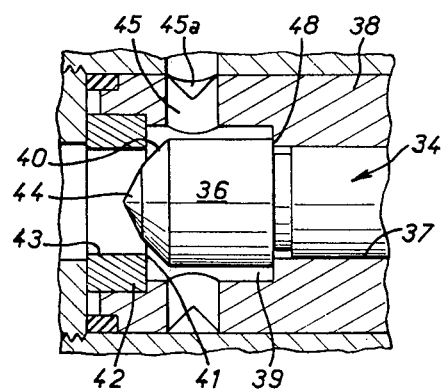
FIG. 3 is a view to a larger scale of the plunger head of the control.

In the embodiment shown in FIGS. 1 to 3, which relates by way of example to the application of the invention to the braking of an automobile vehicle, references 10 and 10' in FIG. 1 designate the front wheels, and 11 and 11' the rear wheels of an automobile vehicle. The right-hand front wheel 10 has a wheel cylinder 12 for the application of the right-hand front brake. The left-hand front wheel 10' has a wheel cylinder 12' for the application of the left-hand front brake. The right-hand rear wheel 11 has a wheel cylinder 13 for the application of the right-hand rear brake. The left-hand rear wheel 11' has a wheel cylinder 13' for the application of the left-hand rear brake.

The wheel cylinder 12' of the left-hand front brake and the wheel cylinder 13 of the right-hand rear brake are connected respectively to two pipes 14 and 15, which are in turn connected (FIGS. 1 and 2) to a first chamber 16 of a master cylinder 17. The master cylinder 17 forms part of the control according to the invention and will be described in detail later on.

The wheel cylinder 12 of the right-hand front brake and the wheel cylinder 13' of the left-hand front brake are connected respectively to two pipes 18 and 19 which are in turn connected to a second chamber 20 of the master cylinder 17, this chamber 20 being coaxial with the first chamber 16.

The vehicle thus has two independent brake circuits: 12', 13, 14, 15, 16 on the one hand, and 12, 13', 18, 19, 20 on the other hand.

The chamber 16 is pressurised with the aid of a master piston 21 operated by means of a rod 22 from a brake pedal (not shown).

In the master piston 21 is mounted a rod 23 having a collar 24. A spring 25 extending in the master piston 21 urges the collar 24 to bear against a stop ring 26. The rod 23 is extended in the forward direction by a projecting part 27 which extends into the chamber 16. The master piston cooperates with a return spring 28 extending in the chamber 16. The spring 28 could be disposed outside the master cylinder. In the example illustrated the spring 25 has greater stiffness than the spring 28. The spring 25 has no initial stressing when the collar 24 is disposed against the stop ring 26.

A reservoir 29 is provided to ensure that the chamber 16 is kept filled and is in communication with the chamber through an aperture 29A which is open when the master piston 21 is at rest. The aperture 29A is closed by the master piston 21 when the latter starts to be driven in. The chamber 20 is fed through a pipe 30 which is connected to the delivery side of a permanent flow volumetric pump 31 driven at a speed equal to or proportional to that of the engine of the automobile vehicle, or at a constant speed by an electric motor, or else by the output shaft of the gearbox (not shown) at a speed proportional to the speed of the vehicle. The pump 31 is fed through a pipe 32 from a reservoir 33.

Between the chambers 16 and 20 (FIG. 3) is mounted a plunger 34 having a tail 35 and a head 36. The tail 35 of the plunger 34 is mounted to slide in a bore 37 in a cylindrical part 38 received in the body 17. The head 36 extends into a cavity 39 provided in the part 38 and is in communication with the chamber 20. The head 36 has a conical annular peripheral bearing surface 40 which cooperates with a seat 41. The seat 41 is formed by a ring 42 embedded in the part 39 in line with the cavity 39. More particularly, the seat 41 is formed by a circular edge following the opening of the internal bore 43 of the ring 42. In front of the conical peripheral bearing surface 40 cooperating with the seat 41 the head 36 has a central conical ogival portion 44. In the example illustrated the conical bearing surface 40 forms a half-angle at the apex of between 40° and 50°, advantageously close to 45°, while the conical portion 44 forms a half-angle at the apex which is advantageously between 50° and 60°, and preferably close to 55°, that is to say larger than the half-angle at the apex of the conical bearing surface 40.

The part 38 has bores 45 establishing communication between the cavity 39 and an annular groove 45a formed on the periphery of the said part 38. The groove 45a is permanently in communication with a pipe 46 leading back to the reservoir 33, whatever the position in which the part 38 is installed. It will be noted more particularly in FIG. 1 that the rear face 47 of the tail 35 of the plunger 34 is subjected to the pressure in the chamber 16 and is adapted to receive the rod 27 bearing against it, if necessary.

It will also be noted that the head 36 of the plunger 34 forms a valve controlling a leakage flow between the chamber 20 and the cavity 39. The head 36 thus constitutes a discharge valve for the pump 31, discharging to the reservoir 33 by way of 30, 20, 40–41, 45, 45a, and 46, and thus defines a pressure level in the chamber 20. This pressure is in turn transmitted to the wheel cylinders 12 and 13' through the pipes 18 and 19.

The plunger 34 is in turn controlled both by the pressure of the chamber 20 which is applied to the head 36 towards the right in FIG. 1, and by the pressure in the chamber 16 which is applied to the end 47 of the tail 35 towards the left in FIG. 1.

In the example illustrated the diameter of the seat 41, that is to say the diameter of the inside bore 43 of the ring 42 is made slightly smaller—for example by a value of the order of 5%—than the diameter of the bore 37 receiving the tail 35. This slight difference in section makes it possible to obtain substantially the equalisation of the pressures in the chamber 16 and in the chamber 20 through the effect of the presence of the plunger 34 interposed between these chambers.

If in fact the sections were absolutely identical the pressures would no longer be equal because of the effect of the pressure gradient at the seat.

In general, it is possible to contemplate different sections on the ends, both in order to obtain strict equalisation of the pressures in the two vessels, as has just been described, and for the purpose of deliberately achieving an effect of amplification of the pressures.

As long as the driver of the vehicle does not depress the brake pedal the spring 26 will hold the master piston 21 pushed back towards the right in FIG. 1, thus keeping the chamber 16 in communication at 29A with the reservoir 29.

The plunger 34 occupies its position at its greatest distance from the seat 41, which is defined by application of the head 36 against a stop shoulder 48 of the part 38 (FIG. 3). The flow from the pump 31 passes from the chamber 20 through a wide opening provided between the conical bearing surface 40 and the seat 41 towards the reservoir 46, and the pressure in the chamber 20 is practically zero, like that in the chamber 16. This being the case, the wheel cylinders 12' and 13 are brought into communication with the reservoir 29, and similarly the wheel cylinders 12 and 13' are brought into communication with the reservoir 33.

When the driver depresses the brake pedal in order to brake, the master piston 21 advances towards the left in FIG. 1 and passes the aperture 29a thus isolating the chamber 16 from the reservoir 29. The chamber 16 reduces in volume in proportion as the master piston 21 is driven in, the stroke of the master piston being the longer, the greater the force applied to the pedal.

The pressure rises in the closed systems 15, 14, 16, 12', 13, which tends on the one hand to operate the cylinders 12' and 13 for the application of the corresponding brakes, and on the other hand to push the plunger 34 towards the left in FIG. 1.

As this is done, the head 36 of the plunger 34 moves away from the stop shoulder 48 through the action of the differential pressure, and reduces the gap between the bearing surface 40 and the seat 41, thus reducing the section for leakage from the chamber 20 to the reservoir 33, and thus effecting an increase of pressure in the chamber 20 which tends to remain equal to the pressure in the chamber 16 in proportion as the last-mentioned pressure in turn tends to increase through the thrust of the master piston 21.

It will be noted that the course of the short stroke of the head 36 of the plunger 34 cooperating with the circuit 18, 19, the depression of the pedal corresponds only to the consumption of the circuit 14, 15, so that the braking apparatus is of an assisted nature.

The pressure of the chamber 20 is transmitted through the ducts 18 and 19 to the wheel cylinders 12 and 13', and because of the unequal pressures in the chambers 16 and 20 it is the same pressure which is developed in all the wheel cylinders 12, 12', 13, 13'.

Because of the conical ogive 44 provided at the front of the head 36, excellent operating performance is achieved. In particular, the flow at the seat 41 takes place under good hydraulic conditions and with as low as possible a residual pressure when the apparatus is at rest.

The braking control according to the invention also has excellent conditions of safety in the event of the failure of a brake circuit.

If the part of the brake circuit 14, 15, 12' and 13 becomes defective, thus destroying the pressure in the chamber 16, when the user depresses the brake pedal the master piston 21 is pushed back towards the left in FIG. 1 until the head 27 bears against the end 47 of the tail 35. As the pedal continues to be operated the master piston 21 is additionally driven in towards the left in FIG. 1, but the shoulder 26 moves away from the collar 24 and the spring 25 is compressed, thus making it possible to introduce a modulating resistance simulating a back-pressure and thus enabling the user to brake with all desirable sensitivity.

This action will in fact have no effect on the circuit 16, 14, 15, 12' and 13, because it has suffered a breakdown, but it permits modulation of the movement of the conical bearing surface 40 towards the seat 41 and thus makes it possible to control the leakage flow from the chamber 20 to the reservoir 46, thus controlling the rise of pressure in the chamber 20 and consequently in the wheel cylinders 12 and 13'.

In the event of the pump 31 or the circuit 20, 18, 19, 12, and 13' being defective, while the circuit 16, 14, 15, 12' and 13 remains intact, the rise in pressure in the chamber 16 is applied to the slide valve 34 and pushes the latter back until the bearing surface 40 bears against the seat 41 and the rise in pressure in the chamber 16 through the action of the master piston 21 is achieved in the same way as with a master cylinder, thus bringing about the rise in pressure in the wheel cylinders 12' and 13.

Reference will now be made to the modified embodiment illustrated in FIGS. 4 to 8, which relate by way of example to an application of the invention to the braking of an automobile vehicle; in FIG. 4, 110 and 110' designate the front wheels and 111 and 111' the rear wheels of the automobile vehicle.

The right-hand front wheel 110 has two wheel cylinders 112 and 113 for the application of the right-hand front brake. The left-hand front wheel 110' similarly has two wheel cylinders 112' and 113' for the application of the left-hand front brake. The right-hand rear wheel 111 has a wheel cylinder 114 for the application of the right-hand rear brake and the left-hand rear wheel 111' has a wheel cylinder 114' for the application of the left-hand rear brake.

The wheel cylinders 112 and 112' are connected to one another by a pipe 115 and the wheel cylinders 114 and 114' are connected to one another by a pipe 116. The pipes 115 and 116 are connected by a pipe 117 provided with a rear braking corrector 118. The wheel cylinders 112, 112', 114, and 114' are fed by a pipe 119 connected to the pipe 115. The wheel cylinders 113 and 113' are connected by pipes 120 and 120' to the pipe 121.

The automobile vehicle thus has two independent braking circuits, on the one hand a first circuit 113, 113', 120, 120', and 121, and on the other hand a second circuit 119, 115, 112,112', 117, 118, 116, 114, 114'.

A master cylinder 122 receives a slidable master piston 123 operated from a brake pedal (not shown).

In the master piston 123 is mounted a rod 124 having a collar 125. A spring 126 extends in the master piston 123 and urges the collar 125 to bear against a stop ring 127.

The rod 124 is extended in the forward direction by a projecting part 128 extending into a chamber 129 of the master cylinder. The pipe 121 connected to the wheel cylinders 113 and 113' by the pipes 120, 120' is in communication with this chamber 129.

The master piston 123 cooperates with a return spring 130 extending in the chamber 129. In the example shown, the spring 126 has greater stiffness than the spring 130. The spring 126 has no initial stressing when the collar 125 is applied against the stop ring 127.

A reservoir 131 is provided to effect the filling of the chamber 129 and is in communication with the latter by way of an aperture 132, which is open when the master piston 123 is at rest. The aperture 132 is closed by the master piston 123 as soon as the latter starts to be driven in.

The master cylinder 122 is provided in front of the chamber 129 with a second chamber 133, which is separated from the first chamber 129 by a plunger 134. The latter (FIGS. 4, 5, 6) is mounted to be slidable in an annular part 135 with a fixed position in the master cylinder 122.

For this purpose the annular part 135 abuts a shoulder 136 of the master cylinder 122 and is held by a sleeve 137 surrounding the chamber 133 and locked on the master cylinder 122 by a stop ring 138.

Figure 5:
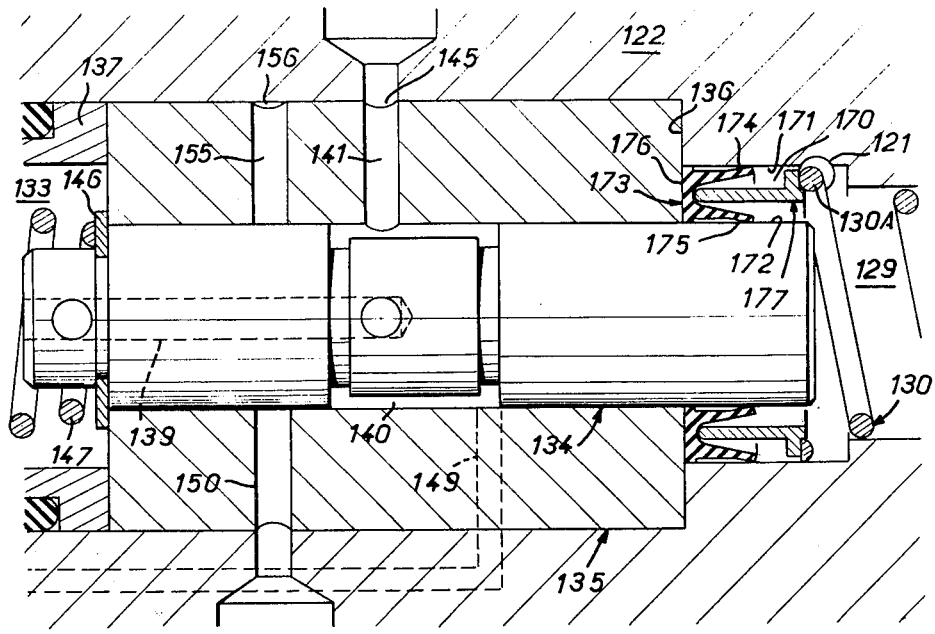
FIG. 5 is a view to a larger scale of the plunger in the position of rest.

The second chamber 133 is in permanent communication with the pipe 119 by way of a bore 139, FIG. 5, provided in the plunger 134, by way of a pipe 141 provided in the attached annular part 135 and in communication with the cavity 140, and by way of a bore 145 provided in the master cylinder 122 and in communication with the pipe 141.

It is thus clearly seen that the first independent circuit comprising the wheel cylinders 113 and 113' is controlled by the pressure of the first chamber 129 of the master cylinder, while the second independent circuit comprising the wheel cylinders 112, and 112', 114 and 114' is controlled by the second chamber 133 of the master cylinder 122.

The pressures in the chambers 129 and 133 are precisely kept equal during normal operation by the plunger 134, whose two end sections are equal in the example illustrated. If these two sections are different, the two pressures are proportional.

The plunger 134 is mounted for sliding in the attached annular part 135 and has a position of rest (FIG. 5) defined by a washer 146 associated with a spring 147. The latter extends in the chamber 133 between the bottom 148 of the sleeve and the said washer 146. The plunger 134 has a working position (FIG. 6) in which it advances in the chamber 133 against the action of the spring 147.

Both in the position of rest and in the working position of the plunger 134 the duct 141 connected to the pipe 119 of the second circuit is in communication permanently with the cavity 140 (FIGS. 5 and 6), that is to say with the second chamber 133.

The cavity 140 cooperates with two ducts 149 and 150 provided in the attached annular part 135 and forming part respectively of a return line 151 and a pressure line 152.

In the position of rest shown in FIG. 5, the cavity 140, and therefore the chamber 133 and the duct 119 of the second brake circuit, are in communication with the duct 149 and the return line 151. In the working position (FIG. 6) the cavity 140, and therefore the chamber 133 and the duct 119 of the second brake circuit, are in communication with the duct 150 and the pressure line 152.

The return duct 149 is in communication with the return line 151 by way of a duct 153 provided in the master cylinder 122, while the duct 150 is in communication with the pressure line 152 by way of a duct 154 provided in the master cylinder 122.

Figure 6:
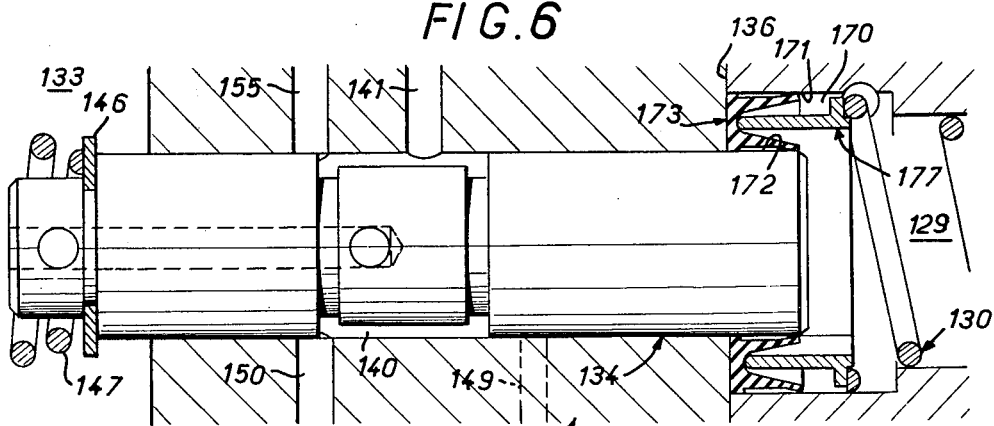
FIG. 6 is a view similar to FIG. 5, in which however the plunger is in the working position.
Figure 7:
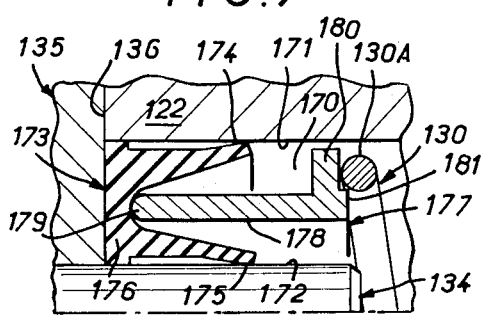
FIG. 7 is a view to an enlarged scale of a double-lip seal associated with the plunger.

It will be seen in FIGS. 5 and 6 that the duct 150 comprises two or more radial arms 155 and an annular groove 156.

The return line 151 and the pressure line 152 cooperate with a pressure station 157. The pressure station has a reservoir 158, FIG. 4, into which penetrates the return line 151, and a source of constant pressure equal to P, such as a pressure accumulator 159. A pump 160 is fed by way of a duct 161 from the reservoir 158, and is connected to the accumulator 159 by means of a cut-out device 162. The latter is interposed between the return line 151 and the pressure line 152, in such a manner that the pump 160 recharges the accumulator 159 if necessary, while the pressure is maintained substantially at the value P in the pressure duct 152. With the arrangement that has just been described, it is expedient that particularly effective sealing should be provided between the plunger and the attached annular part 135 and, between the attached part 135 and the master cylinder 122.

As can be seen in FIGS. 5 and 6, an annular recess 170 is provided between the bore 171 of the chamber 129 of the master cylinder 122 and the outer cylindrical wall 172 of the plunger 134.

An annular seal 173 serving two purposes is inserted into the recess 170 and has an outer face 174 applied against the bore 171 and an inner face 175 applied against the wall 172. The seal 173 has a generally U-shaped section with a bottom 176 applied against the part 135 and two lips defining the application faces 174, 175 extending towards the chamber 129.

The lip 174 provides sealing at 171 between the parts 135 and 122, while the lip 175 seals at 172 between the parts 134 and 135. The U-shape formed by the lips 174 and 175 and the bottom 176 is particularly suitable for the mode of operation of the plunger 134, whose stroke is very short, for example of the order of a millimeter. The profile of the seal 173 permits negligible friction against the wall 172 of the plunger 134.

The return spring 130 of the master piston 123 serves to hold the seal 173 against the part 135, and for that purpose the last turn 130A of the spring 130, at the opposite end to the master piston 123, is engaged in the cavity of the seal 173 disposed between the two lips 174 and 175 with the aid of a ring 177 (FIGS. 5 to 7) pressing the bottom 176 of the seal 173 against the part 135.

The ring 177 is annular with an L-shaped section. It has (FIG. 7) a cylindrical portion 178 whose end 179 is engaged against the bottom 176 of the seal 173. The end 179 is rounded in order to prevent damage to the bottom 176. The ring 177 also has a plane portion 180 in the form of an external collar, on which rests the last turn 130A of the spring 130. The collar 180 has a central annular step 181 for the centering of the turn 130A.

Figure 4:
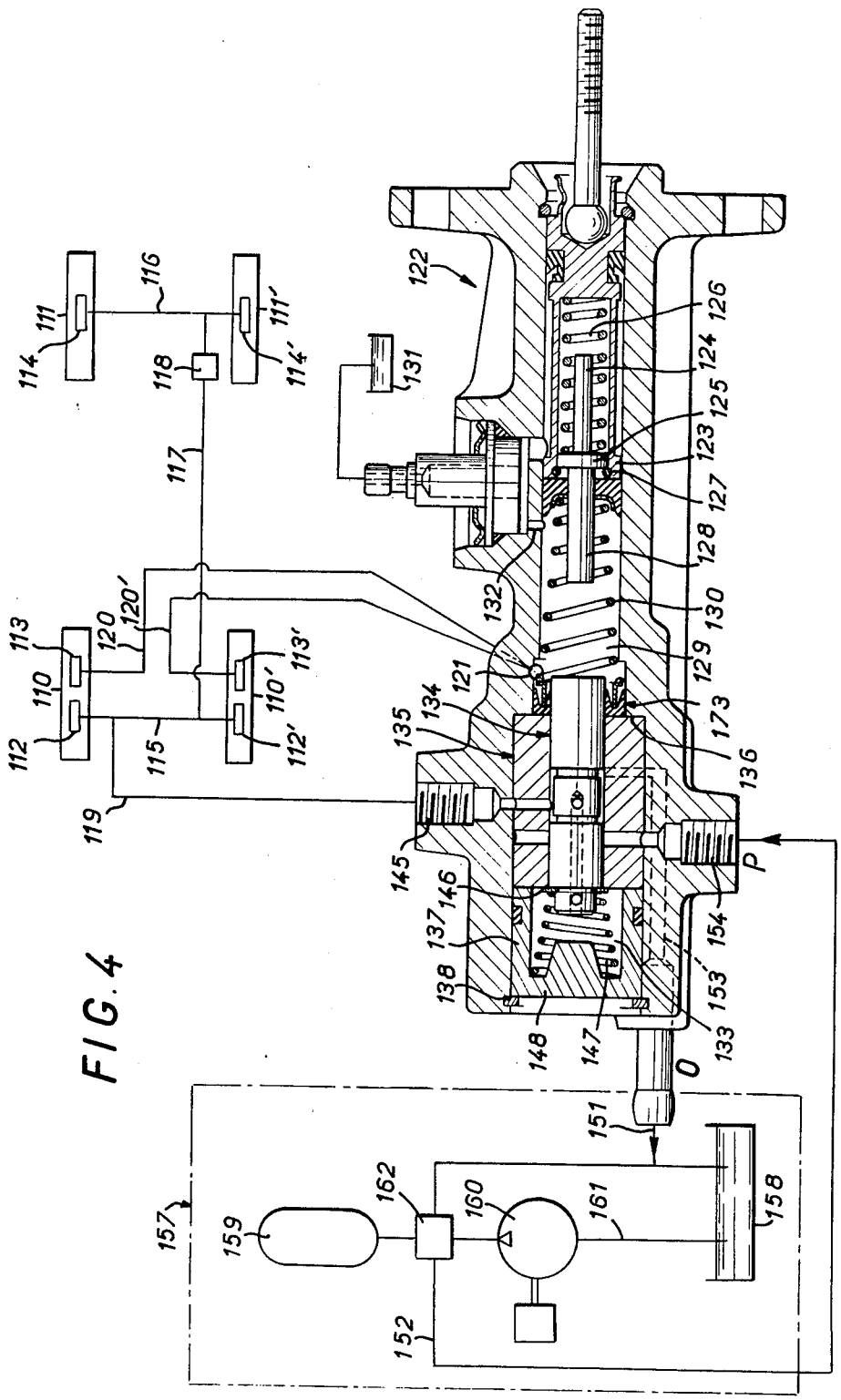
FIG. 4 is a view in section of a modified control master cylinder according to the invention and shows diagrammatically the hydraulic circuits.

As long as the driver does not depress the brake pedal, the spring 130 holds the master piston 123 pushed back towards the right in FIG. 4, thus bringing the chamber 129 into communication at 132 with the reservoir 131.

The plunger 134 occupies the position shown in FIGS. 4 and 5. The wheel cylinders 112 and 113' are brought into communication with the reservoir 131 by way of 120, 120', 121, 129, and 132, while the wheel cylinders 112, 112', 114, and 114' are brought into communication with the reservoir 158 by way of 119, 145, 141, 140, 149, 153, 151.

When the driver depresses the pedal for the purpose of braking, the master piston 123 advances towards the left in FIG. 4 and passes the aperture 132, thus isolating the chamber 129 from the reservoir 131. The chamber 129 decreases in volume in proportion as the master piston 123 is driven in, the stroke of the latter being the longer the greater the force applied to the pedal.

The pressure rises in the closed system 129, 121, 120, 120', 113, and 113', and also tends to push the plunger 134 towards the left in FIGS. 4, 5, and 6 against the action of the spring 147. The pressure presses the lips 174 and 175 of the seal 173 into contact at 171 and 172 respectively.

The plunger 134 thus passes from the position of rest in FIG. 5 to the working position shown in FIG. 6, in which the closed system 112, 112', 115, 117, 118, 116, 114, 114', 119, 145, 141, 140, 139, 133 is brought into communication with the duct 150 and the pressure line 152. When this communication starts to be established the pressure of the accumulator 159 builds up in the said closed system. The wheel cylinders 112, 112', 114, 114' are operated. At the same time the pressure in the chamber 133 opposes the driving-in of the plunger 134, so that equalisation is achieved between the chamber 129 and the pressure in the chamber 133, while the ducts 155 are closed.

The application of the brakes under the action of the wheel cylinders 112, 112', 114 and 114', with the assistance of the accumulator 159 is modulated in dependence on the pressure conditions in the chamber 129, translating the conditions of real braking at the wheel cylinders 113 and 113' under the direct action of the master piston 123.

In the event of the first closed system 113, 113', 120, 120', 121, 129 becoming defective, thus destroying the pressure in the chamber 129, when the user depresses the brake pedal the master piston 123 is pushed back towards the left in FIG. 4 until the rod 128 comes to bear against the plunger 134. When the operation of the pedal is continued the master piston 123 is additionally driven in towards the left in FIG. 4. The stop ring 127 moves away from the collar 125 and the spring 126 is compressed, thus making it possible to introduce a modulating resistance simulating a back-pressure. The user can thus brake with all the desirable sensitivity.

In the event of the failure of the pressure station 157 or of the closed system 112, 112', 115, 117, 118, 116, 114, 114', 119, 145, 141, 140, 139, 133, the rise in pressure in the chamber 129 acts on the plunger 134 and presses the latter back until it bears against the bottom 148 of the sleeve 137. The rise in pressure in the chamber 129 through the action of the master piston 123 then takes place as in a master cylinder of normal type, although braking is effected only by the wheel cylinders 113, 113'.

Figure 8:
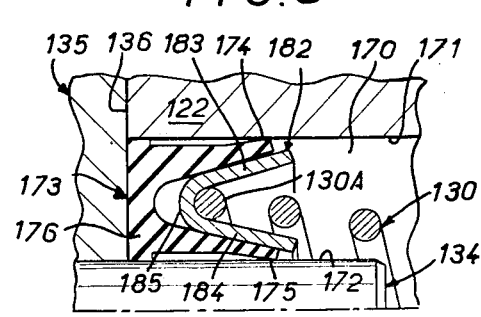
FIG. 8 is similar to FIG. 7 but relates to a modified embodiment.

In the modified embodiment shown in FIG. 8 the arrangement is similar to that described with reference to FIGS. 4 to 7, but the L-shaped ring 177 is replaced by a ring 182 of substantially V-shaped section.

The ring 182 has two sloping surfaces 183 and 184 applied respectively against the lips 174 and 175. It also has a rounded bottom 185 connecting the two sloping surfaces 183 and 184. This bottom 185 is spaced apart from the bottom 176 of the seal 173 and receives in a centred manner the last turn 130A of the spring 130.

I claim:

1. A hydraulic control, particularly for an automobile vehicle brake system having two separate independent circuits, in which control a master cylinder comprises a first chamber in which pressure is controlled by the driving-in of a master piston under the action of a brake pedal, said first chamber forming part of a first hydraulic closed system comprising a first brake circuit, the master cylinder also having a second pressure chamber forming part of a second closed system comprising a second brake circuit, the said second chamber being adapted to be fed by a source of fluid pressure, the said master cylinder being provided with a plunger comprising a valve that controls said source of fluid pressure and whose two opposite faces are subjected respectively to the pressures of the two closed systems, the master piston being disposed in the first chamber coaxially with the plunger in such a manner as to permit mechanical intervention in the event of hydraulic failure in the first closed system, the plunger being mounted in a part accommodated in the body of the master cylinder, the master cylinder having a bore having a shoulder against which the said accommodated part is applied, an annular recess being formed on the first chamber side between the bore of the master cylinder and the plunger, a seal inserted in the annular recess with an outer face applied against the bore of the master cylinder and an inner face applied against the plunger, means for holding the seal in the axial position, said means comprising a return spring for the master piston, the spring being interposed between the said master piston and the seal in such a manner as to hold the latter applied against the said accommodated part, the master piston cooperating on the one hand permanently with the said return spring, and on the other hand, in the event of the failure of the first closed system, after the master piston has been driven in, with a second spring acting between the master piston and the plunger in order to introduce modulating resistance simulating back-pressure.

2. A hydraulic control, particularly for an automobile vehicle brake system having two separate independent circuits, in which control a master cylinder comprises a first chamber in which pressure is controlled by the driving-in of a master piston under the action of a brake pedal and against the action of a return spring, said first chamber forming part of a first hydraulic closed system comprising a first brake circuit, said first chamber being in constant communication with the first brake circuit so that throughout normal operation the force exerted through the brake pedal to the master piston is applied directly to the fluid in the first chamber and to the first brake circuit, the master cylinder also having a second pressure chamber forming part of a second closed system comprising a second brake circuit the said second chamber being adapted to be fed by a source of fluid pressure, the said master cylinder being provided with a one-piece plunger comprising a sliding valve member that controls said source of fluid pressure, two opposite end faces of said sliding valve member being subjected respectively to the pressures of the two closed systems, the master piston being disposed in the first chamber coaxially with the plunger in such a manner as to permit mechanical displacement of the plunger to actuate the second brake circuit in the event of hydraulic failure in the first closed system, the master piston cooperating permanently with the said return spring, and a second spring operatively disposed between said master piston and the plunger which is inoperative throughout normal operation of the hydraulic control when there is full fluid pressure in said first chamber, and, in the event of the failure of the first closed system, after the master piston has been driven in, with the second spring which only then acts between the master piston and the plunger in order to introduce modulating resistance simulating back-pressure, the plunger being mounted in a part accommodated in the body of the master cylinder, the master cylinder having a bore having a shoulder against which the said accommodated part is applied, an annular recess being formed on the first chamber side between the bore of the master cylinder and the plunger, and a seal in the annular recess with an outer face applied against the bore of the master cylinder and an inner face applied against the plunger.

3. A hydraulic control according to claim 2, characterized in that the seal has a generally U-shaped section with two lips defining respectively the faces applied against the bore of the cylinder and against the plunger and extending towards the first chamber.

4. A control according to claim 2, characterized in that means are provided for holding the seal in the axial position.

5. A control according to claim 3, characterized in that means are provided for holding the seal in the axial position.

6. A hydraulic control according to claim 4, characterized in that the said means consist of a return spring for the master piston, the spring being interposed between the said master piston and the seal in such a manner as to hold the latter applied against the said accommodated part.

7. A hydraulic control according to claim 5, characterized in that the last-named means include a coil compressure spring and the turns of the spring close to the seal are applied against a ring engaged against the seal between the two lips of the latter.

8. A hydraulic control according to claim 7, characterized in that the said ring has an L-shaped section.

9. A hydraulic control according to claim 7, characterized in that the said ring has a substantially V-shaped section.

10. A control according to claim 2, characterized in that the plunger has a head having a conical annular peripheral bearing surface for application against a seat and a central frontal portion surrounded by the said conical bearing surface and having an ogival shape whose half-angle at the apex is slightly larger than the half-angle at the apex of the conical bearing surface.

11. A control according to claim 10, characterized in that the conical bearing surface forms a half-angle at the apex of between 40° and 50°, preferably close to 45', while the half-angle at the apex of the ogive is between 50° and 60°, preferably close to 55°.

12. A control according to claim 10, characterized in that the ogive is conical.

13. A control according to claim 2, characterized in that the master piston is disposed in the first chamber coaxially with the plunger so as to permit mechanical intervention in the event of hydraulic failure in the first closed system, the master piston being returned by a first spring and receiving a rod adapted to come into contact with the plunger, the said rod being coupled to the master piston by a second spring having no initial stressing and serving as simulator of resistance to the depression of the brake pedal.

14. A control according to claim 13, characterized in that the master piston is in the form of a hollow sleeve in which is engaged a collar of the rod forming a movable seat for the second spring.

15. A control according to claim 2, characterized in that the end of the plunger subjected to the pressure of the first closed system has a different section from that of a seat associated with the second closed system.

16. A control according to claim 2, characterized in that the said fluid pressure source is a source of constant pressure.

17. A control according to claim 2, characterized in that the said source of fluid pressure is a permanent flow source of the volumetric type.

* * * * *